(12) United States Patent
Hirano et al.

(10) Patent No.: US 12,712,459 B2
(45) Date of Patent: Aug. 18, 2026

(54) ISOLATED POWER SUPPLY APPARATUS

(71) Applicant: DENSO CORPORATION, Kariya-city (JP)

(72) Inventors: Takeshi Hirano, Kariya-city (JP); Hitoshi Ozaki, Kariya-city (JP); Akira Tokumasu, Kariya-city (JP); Atsuki Asano, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 169 days.

(21) Appl. No.: 18/822,907

(22) Filed: Sep. 3, 2024

(65) Prior Publication Data

US 2024/0429825 A1 Dec. 26, 2024

Related U.S. Application Data

(63) Continuation of application No. PCT/JP2023/003400, filed on Feb. 2, 2023.

(30) Foreign Application Priority Data

Mar. 2, 2022 (JP) ................................ 2022-032151

(51) Int. Cl.
*H02M 3/335* (2006.01)

(52) U.S. Cl.
CPC ............................... *H02M 3/33523* (2013.01)

(58) Field of Classification Search
CPC ... H02M 3/33523; H02M 7/5387; H02M 1/08
USPC ...................................................... 363/21.12
See application file for complete search history.

(56) References Cited

U.S. PATENT DOCUMENTS 8,351,230 B2 * 1/2013 Nishihara .............. H02M 3/01 363/21.02
2015/0085536 A1 * 3/2015 Miyauchi ............... B60L 50/51 363/21.16
2015/0364984 A1 * 12/2015 Miyauchi ........... H02M 7/5387 363/132
2016/0218633 A1 7/2016 Nishijima
2019/0043664 A1 2/2019 Hiyama

* cited by examiner

*Primary Examiner* — Yemane Mehari
(74) *Attorney, Agent, or Firm* — Oliff PLC

(57) ABSTRACT

An isolated power supply apparatus includes transformers, input sides of which are connected with a DC power source and output sides of which are connected with power supply targets corresponding to the transformers. At least two of the transformers have respective feedback windings. The apparatus further includes: a control switch configured to allow supply of electric power from the DC power source to the input sides of the transformers by being turned on and interrupt the supply of electric power from the DC power source to the input sides of the transformers by being turned off; an acquisition unit configured to acquire a control value based on voltages generated in the feedback windings; and a control unit configured to turn on and off the control switch so as to feedback-control the control value to a target value and thereby control voltages on the output sides of the transformers.

10 Claims, 6 Drawing Sheets

MG
10
12
13
14
30
31
32
20
SWH
GWH
SVH
GVH
SUH
GUH
SWL
GWL
SVL
GVL
SUL
GUL
U
V
W
SCH
GCH
SCL
GCL
GUH, GVH, GWH
GUL, GVL, GWL
GCH, GCL
44
INTERFACE
42
40
CONTROL DEVICE
Trq*
LOW-VOLTAGE SYSTEM
HIGH-VOLTAGE SYSTEM

100
DRIVE CIRCUIT
POWER SUPPLY IC
(FEEDBACK-CONTROL Vfb1 TO Vtgt)
VCC
Tfb1
GND
SCL
SUL
SVL
SWL
DCL
DUL
DVL
DWL
SCH
SUH
SVH
SWH
DCH
DUH
DVH
DWH
50
51
42
80
82
83
84
85
LNa
LNb
LNc
LNd
LNe
LPa
LPb
LPc
LPd
LPe
L2a 100
DRIVE CIRCUIT
DCL
DUL
DVL
DWL
SCL
SUL
SVL
SWL
DCH
DUH
DVH
DWH
SCH
SUH
SVH
SWH
65a
65b
65c
65d
65e
60a
60b
60c
60d
60e
62a
62b
62c
62d
62e
64a
64b
64c
64d
64e
61a
61b
61c
61d
61e
63a
63b
63c
63d
T1a
T2a
T3a
T4a
T1b
T2b
T3b
T4b
T1c
T2c
T3c
T4c
T1d
T2d
T3d
T4d
T1e
T2e
LPa
LPb
LPc
LPd
LPe
71a
71b
71c
71d
72a
72b
72c
72d
LGa
LGb
LGc
LGd
LRa
LRb
LRc
LRd
LNa
LNb
LNc
LNd
LNe
Lt
84
85
51
50
42
Tfb1
GND
VCC
POWER SUPPLY IC
(FEEDBACK-CONTROL Vfb1 TO Vtgt)

100
SCL
SUL
SVL
SWL
DCL
DUL
DVL
DWL
DRIVE CIRCUIT
SCH
SUH
SVH
SWH
DCH
DUH
DVH
DWH
65a
65b
65c
65d
65e
60a
60b
60c
60d
60e
62a
62b
62c
62d
62e
64a
64b
64c
64d
64e
61a
61b
61c
61d
61e
63a
63b
63c
63d
T1a
T2a
T3a
T4a
T1b
T2b
T3b
T4b
T1c
T2c
T3c
T4c
T1d
T2d
T3d
T4d
T1e
T2e
LPa
LPb
LPc
LPd
LPe
LGa
LGb
LGc
LGd
LRa
LRb
LRc
LRd
LNa
LNb
LNc
LNd
LNe
71a
72a
84
85
51
50
42
Tfb1
POWER SUPPLY IC
(FEEDBACK-CONTROL Vfb1 TO Vtgt)
GND
VCC 100
LPe
LPa
T1a
LNa
T2a
61a
62a
64a
65a
60a
DCH
SCH
DRIVE CIRCUIT
LPb
T1b
LNb
T2b
61b
62b
64b
65b
60b
DUH
SUH
DRIVE CIRCUIT
LPc
T1c
LNc
T2c
61c
62c
64c
65c
60c
DVH
SVH
DRIVE CIRCUIT
LPd
T1d
LNd
T2d
61d
62d
64d
65d
60d
DWH
SWH
DRIVE CIRCUIT
LPe
T1e
T2e
T3e
T4e
61e
62e
63e
64e
65e
60e
DCL
SCL
DRIVE CIRCUIT
DUL
SUL
DRIVE CIRCUIT
DVL
SVL
DRIVE CIRCUIT
DWL
SWL
DRIVE CIRCUIT
42
50
VCC
Tfb1
POWER SUPPLY IC
(FEEDBACK-CONTROL Vfb1 TO Vtgt)
GND
51
LRe
84
85
LGe
72e
71e

ISOLATED POWER SUPPLY APPARATUS

CROSS-REFERENCE TO RELATED APPLICATIONS

The present application is a continuation application of International Application No. PCT/JP2023/003400 filed on Feb. 2, 2023, which is based on and claims priority from Japanese Patent Application No. 2022-032151 filed on Mar. 2, 2022. The entire contents of these applications are incorporated by reference into the present application.

BACKGROUND

1 Technical Field

The present disclosure relates to isolated power supply apparatuses.

2 Description of Related Art

There are known isolated power supply apparatuses applied to systems that include a DC power source and a plurality of power supply targets; these isolated power supply apparatuses are configured to supply electric power from the DC power source to the power supply targets while electrically isolating the DC power source from the power supply targets. For example, Japanese Patent No. JP 6817298 B2 discloses an isolated power supply apparatus that includes a plurality of transformers. For each of the transformers, the input side of the transformer is connected with the DC power source, whereas the output side of the transformer is connected with one of the power supply targets which corresponds to the transformer. Moreover, for each of the transformers, the voltage on the output side of the transformer is controlled by controlling the voltage of the DC power source applied to the input side of the transformer.

SUMMARY

A feedback winding may be provided in one of the transformers. In this case, the isolated power supply apparatus may acquire the voltage generated in the feedback winding as a control value, and perform feedback control of controlling the acquired control value to a target value. However, there is a concern that the output voltages of the transformers may become excessively higher or excessively lower than a target output voltage due to the transformer in which the feedback winding is provided, thereby lowering the controllability of the output voltages of the transformers.

The present disclosure has been accomplished in view of the above circumstances.

According to a first aspect of the present disclosure, there is provided an isolated power supply apparatus which includes a plurality of transformers, a control switch, an acquisition unit and a control unit. Input sides of the transformers are connected with a DC power source; and output sides of the transformers are connected with power supply targets corresponding to the transformers. At least two of the transformers have respective feedback windings. The control switch is configured to allow supply of electric power from the DC power source to the input sides of the transformers by being turned on and interrupt the supply of electric power from the DC power source to the input sides of the transformers by being turned off. The acquisition unit is configured to acquire, based on voltages generated in the feedback windings, a control value for feedback control. The control unit is configured to turn on and off the control switch so as to feedback-control the control value to a target value and thereby control voltages on the output sides of the transformers.

In the case of a feedback winding being provided in only one of the transformers, the number of transformers whose output voltages are reflected in the control value would be reduced due to the fact that only one of the transformers is provided with the feedback winding. Consequently, the output voltages of those of the transformers which are not provided with the feedback winding might become excessively higher or excessively lower than the target output voltage.

In view of the above, according to the first aspect of the present disclosure, the control value is acquired based on the voltages generated in the feedback windings provided in at least two of the transformers. Consequently, it becomes possible to perform the feedback control with the control value reflecting the output voltages of more transformers than in the case of the control value being acquired based on the voltage generated in a feedback winding provided in only one of the transformers. Hence, it becomes possible to prevent the output voltages of the transformers from becoming excessively higher or excessively lower than the target output voltage. As a result, it becomes possible to improve the controllability of the output voltages of the transformers.

According to a second aspect of the present disclosure, there is provided an isolated power supply apparatus which includes a plurality of transformers, a control switch, an acquisition unit and a control unit. Input sides of the transformers are connected with a DC power source; and output sides of the transformers are connected with power supply targets corresponding to the transformers. At least two of the transformers have different numbers of the power supply targets connected therewith. A specific transformer, which has a maximum number of the power supply targets connected with the output side thereof among the transformers, has a feedback winding. The control switch is configured to allow supply of electric power from the DC power source to the input sides of the transformers by being turned on and interrupt the supply of electric power from the DC power source to the input sides of the transformers by being turned off. The acquisition unit is configured to acquire, based on a voltage generated in the feedback winding, a control value for feedback control. The control unit is configured to turn on and off the control switch so as to feedback-control the control value to a target value and thereby control voltages on the output sides of the transformers.

In the case of a feedback winding being provided in only one of the transformers, the output voltages of the transformers may change significantly due to load fluctuation in the power supply target(s) connected with the output side of the transformer in which the feedback winding is provided. Specifically, when the power supply target(s) stop(s) operating or operate(s) under a high load, the output voltage of the transformer connected with the power supply target(s) may change significantly. Moreover, when the transformers have different numbers of the power supply targets connected therewith, overall load fluctuation in the power supply target(s) connected with the output side of a first transformer may be reduced compared to overall load fluctuation in the power supply target(s) connected with the output side of a second transformer; the number of the power supply target(s) connected with the output side of the first transformer is greater than the number of the power supply target(s) connected with the output side of the second transformer. Therefore, it may be desirable to acquire, as the control value, the voltage generated in a feedback winding provided in one of the transformers which has the maximum number of the power supply targets connected with the output side thereof.

In view of the above, according to the second aspect of the present disclosure, the feedback winding is provided in the specific transformer which has the maximum number of the power supply targets connected with the output side thereof among the transformers. Consequently, compared to the case of a feedback winding being provided in only one of the other transformers than the specific transformer, it becomes possible to suppress overall load fluctuation in the power supply targets connected with the output side of the specific transformer, thereby suppressing change in the output voltage of the specific transformer. Thus, it also becomes possible to suppress change in the voltage generated in the feedback winding, thereby suppressing change in the control value. Hence, it becomes possible to suppress the deviation of the control value from the target value, thereby suppressing increase in the amount of change in the output voltages of the transformers during the feedback control. As a result, it becomes possible to prevent the output voltages of the transformers from becoming excessively higher or excessively lower than the target output voltage, thereby improving the controllability of the output voltages of the transformers.

DESCRIPTION OF EMBODIMENTS

First Embodiment

Hereinafter, a first embodiment embodying an isolated power supply apparatus according to the present disclosure will be described with reference to the drawings. The isolated power supply apparatus according to the present embodiment is installed in a vehicle such as a hybrid vehicle.

Figure 1:
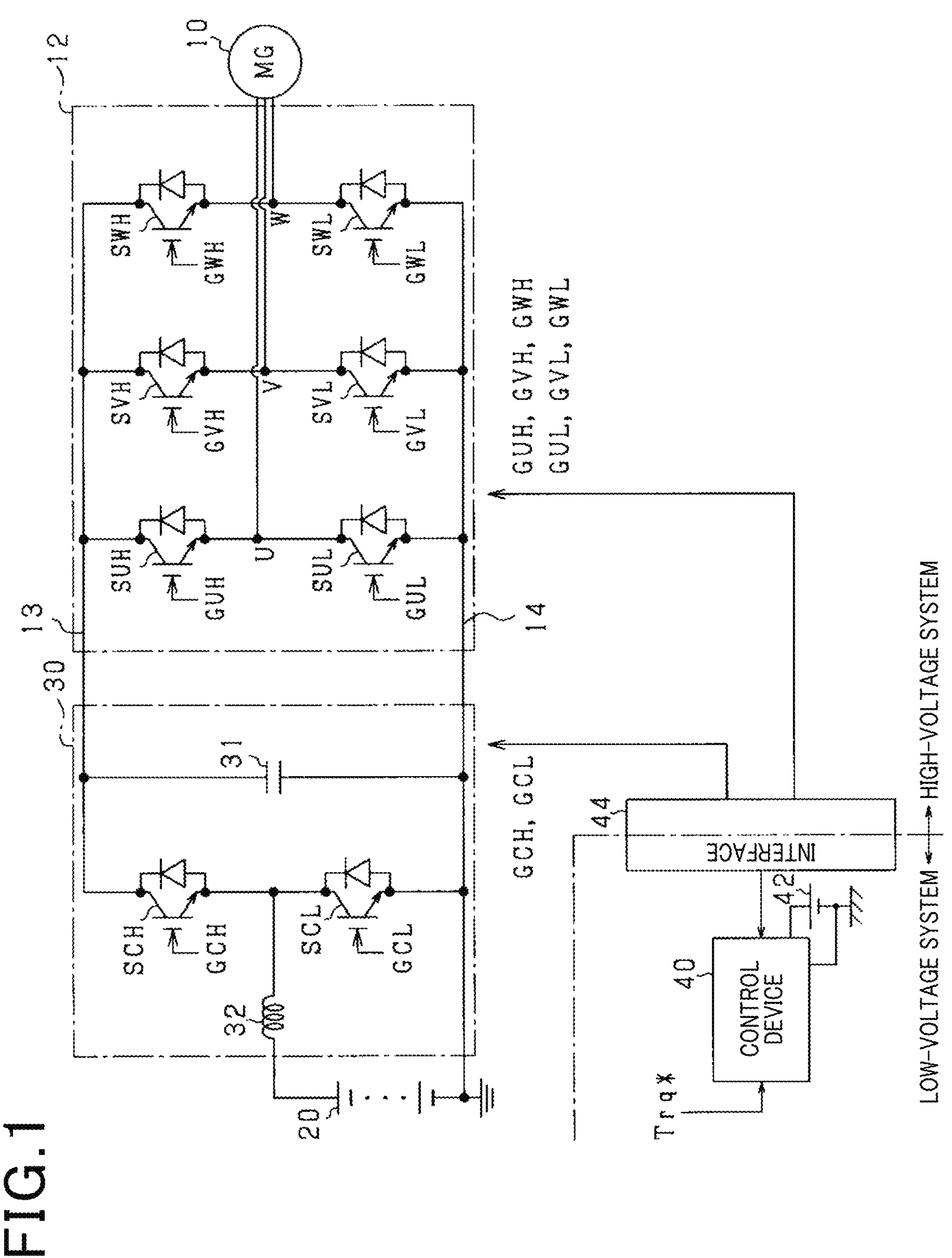
FIG. 1 is an overall configuration diagram of a system according to a first embodiment.

As shown in FIG. 1, a system according to the present embodiment includes a motor-generator 10, an inverter 12, a boost converter 30 and a control device 40. The motor-generator 10 is connected, via a power division mechanism (not shown), with drive wheels and an engine that serves as an in-vehicle main machine. Moreover, the motor-generator 10 is also connected with the inverter 12 and serves as an in-vehicle main machine. The inverter 12, which is a three-phase inverter, is connected with a high-voltage battery 20 (e.g., a lithium-ion secondary battery or a nickel-hydrogen secondary battery) via the boost converter 30.

The boost converter 30 includes a smoothing capacitor 31, a reactor 32, an upper-arm boost switch SCH and a lower-arm boost switch SCL. In the present embodiment, voltage-controlled semiconductor switches, more particularly IGBTs, are employed as the upper-arm boost switch SCH and the lower-arm boost switch SCL. Moreover, each of the switches SCH and SCL has a freewheel diode connected in antiparallel thereto.

An emitter of the upper-arm boost switch SCH is connected with a collector of the lower-arm boost switch SCL. To a collector of the upper-arm boost switch SCH, there is connected a first end of the smoothing capacitor 31. To an emitter of the lower-arm boost switch SCL, there are connected both a second end of the smoothing capacitor 31 and a negative terminal of the high-voltage battery 20. Consequently, a series connection unit consisting of the boost switches SCH and SCL is connected in parallel to the smoothing capacitor 31. Moreover, both the emitter of the upper-arm boost switch SCH and the collector of the lower-arm boost switch SCL are connected, via the reactor 32, with a positive terminal of the high-voltage battery 20. The boost converter 30 boosts an output voltage of the high-voltage battery 20 by turning on and off each of the boost switches SCH and SCL.

The inverter 12 includes series connection units of three phases; each of the series connection units consists of one of upper-arm switches SUH, SVH and SWH and one of lower-arm switches SUL, SVL and SWL. In the present embodiment, voltage-controlled semiconductor switches, more particularly IGBTs, are employed as the switches SUH to SWL. Moreover, each of the switches SUH to SWL has a freewheel diode connected in antiparallel thereto.

An emitter of the U-phase upper-arm switch SUH is connected with a collector of the U-phase lower-arm switch SUL. A junction point between the U-phase upper-arm switch SUH and the U-phase lower-arm switch SUL is connected with a U-phase input terminal of the motor-generator 10. An emitter of the V-phase upper-arm switch SVH is connected with a collector of the V-phase lower-arm switch SVL. A junction point between the V-phase upper-arm switch SVH and the V-phase lower-arm switch SVL is connected with a V-phase input terminal of the motor-generator 10. An emitter of the W-phase upper-arm switch SWH is connected with a collector of the W-phase lower-arm switch SWL. A junction point between the W-phase upper-arm switch SWH and the W-phase lower-arm switch SWL is connected with a W-phase input terminal of the motor-generator 10.

Collectors of the upper-arm switches SUH to SWH are connected with each other by a positive bus 13 such as a busbar. Moreover, the positive bus 13 is connected with the collector of the upper-arm boost switch SCH and the first end of the smoothing capacitor 31. On the other hand, emitters of the lower-arm switches SUL to SWL are connected with each other by a negative bus 14 such as a busbar. Moreover, the negative bus 14 is connected with the emitter of the lower-arm boost switch SCL, the second end of the smoothing capacitor 31 and the negative terminal of the high-voltage battery 20.

The control device 40, which is implemented by a microcomputer, is driven by electric power supplied from a low-voltage battery 42 that serves as a DC power source. The control device 40 operates the inverter 12 and the boost converter 30 so as to control the torque of the motor-generator 10 to a command torque Trq*. Specifically, to turn on and off the switches SUH to SWL that constitute the inverter 12, the control device 40 generates operation signals GUH to GWL and outputs them to drive circuits of the switches SUH to SWL. Moreover, to turn on and off the switches SCH and SCL that constitute the boost converter 30, the control device 40 generates operation signals GCH and GCL and outputs them to drive circuits of the switches SCH and SCL.

The low-voltage battery 42 is a storage battery whose output voltage is lower than the output voltage of the high-voltage battery 20. The low-voltage battery 42 may be implemented by, for example, a lead-acid battery. In addition, in the present embodiment, the low-voltage battery 42 corresponds to a "DC power source".

An interface unit 44 has a function of transmitting signals between a high-voltage system and a low-voltage system while electrically isolating between them; the high-voltage system includes the motor-generator 10, the inverter 12, the boost converter 30 and the high-voltage battery 20, whereas the low-voltage system includes the control device 40 and the low-voltage battery 42. The interface unit 44 may be implemented by, for example, a photocoupler.

Figure 2:
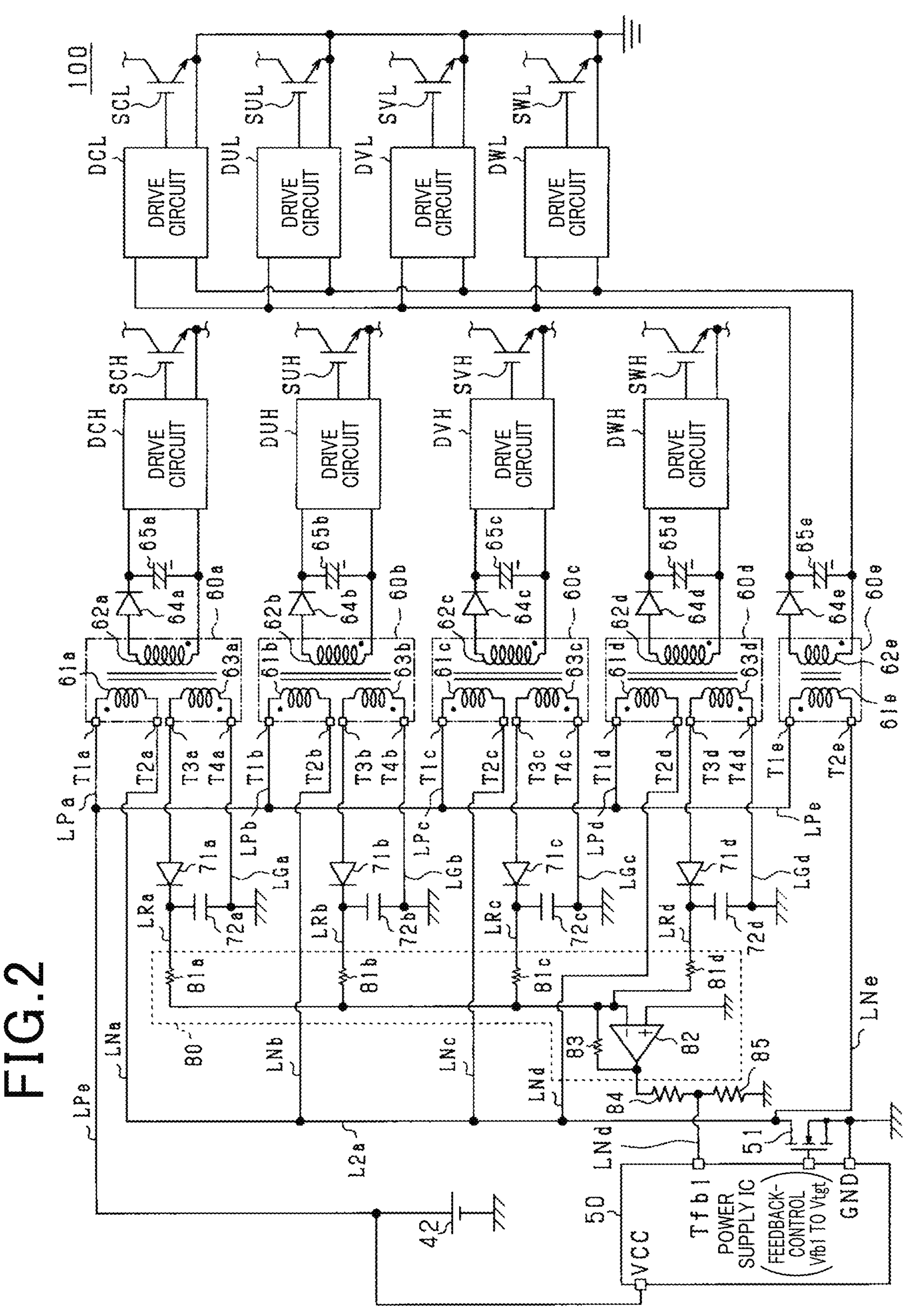
FIG. 2 is a diagram illustrating the configuration of an isolated power supply apparatus according to the first embodiment.

Next, the isolated power supply apparatus 100 according to the present embodiment will be described with reference to FIG. 2. The isolated power supply apparatus 100 has a function of supplying electric power to the drive circuits DCH, DCL and DUH to DWL that respectively drive the switches SCH, SCL and SUH to SWL, while providing isolation between the high-voltage system and the low-voltage system. In the present embodiment, the isolated power supply apparatus 100 is configured as a flyback type switching power supply.

The isolated power supply apparatus 100 includes a power supply IC 50 and a control switch 51. The power supply IC 50 is configured to turn on and off the control switch 51. The control switch 51 is implemented by a voltage-controlled semiconductor switch, more particularly by an N-channel MOSFET.

The isolated power supply apparatus 100 also includes a plurality of upper-arm transformers that supply electric power respectively to the upper-arm drive circuits DCH, DUH, DVH and DWH, and a lower-arm transformer that supplies electric power to the lower-arm drive circuits DCL, DUL, DVL and DWL. That is, the plurality of upper-arm transformers are provided individually respectively corresponding to the upper-arm switches SCH, SUH, SVH and SWH. On the other hand, the lower-arm transformer is provided as a common transformer to all the lower-arm switches SCL, SUL, SVL and SWL.

Specifically, the plurality of upper-arm transformers are first to fourth transformers 60*a*, 60*b*, 60*c* and 60*d*; and the lower-arm transformer is a fifth transformer 60*e*. The first transformer 60*a* is configured to supply electric power to the boost upper-arm drive circuit DCH. The second transformer 60*b* is configured to supply electric power to the U-phase upper-arm drive circuit DUH. The third transformer 60*c* is configured to supply electric power to the V-phase upper-arm drive circuit DVH. The fourth transformer 60*d* is configured to supply electric power to the W-phase upper-arm drive circuit DWH. The fifth transformer 60*e* is configured to supply electric power to the boost lower-arm drive circuit DCL and the U-phase, V-phase and W-phase lower-arm drive circuits DUL, DVL and DWL. In addition, in the present embodiment, each of the drive circuits DCH, DCL and DUH to DWL corresponds to a "power supply target".

The first transformer 60*a* includes a first input winding 61*a*, a first output winding 62*a* and a first feedback winding 63*a*. Moreover, the first transformer 60*a* also includes a common core around which the windings 61*a*, 62*a* and 63*a* are wound; and the windings 61*a*, 62*a* and 63*a* are magnetically coupled by the common core.

Similar to the first transformer 60*a*, the second transformer 60*b* includes a second input winding 61*b*, a second output winding 62*b* and a second feedback winding 63*b* that are magnetically coupled by a common core. Similar to the first transformer 60*a*, the third transformer 60*c* includes a third input winding 61*c*, a third output winding 62*c* and a third feedback winding 63*c* that are magnetically coupled by a common core. Similar to the first transformer 60*a*, the fourth transformer 60*d* includes a fourth input winding 61*d*, a fourth output winding 62*d* and a fourth feedback winding 63*d* that are magnetically coupled by a common core.

The fifth transformer 60*e* includes a fifth input winding 61*e* and a fifth output winding 62*e*. Moreover, the fifth transformer 60*e* also includes a common core around which the windings 61*e* and 62*e* are wound; and the windings 61*e* and 62*e* are magnetically coupled by the common core.

In each of the transformers 60*a* to 60*e*, there are provided a plurality of terminals. Specifically, to each of the output terminals of the first to fifth transformers 60*a* to 60*e*, there is connected a corresponding one of the first to fifth output windings 62*a* to 62*e*.

A first terminal T1*a* of the first transformer 60*a* is connected with a second terminal T2*a* of the first transformer 60*a* via the first input winding 61*a*. A third terminal T3*a* of the first transformer 60*a* is connected with a fourth terminal T4*a* of the first transformer 60*a* via the first feedback winding 63*a*. Upon the control switch 51 being turned on and thereby the electric potential of the first terminal T1*a* of the first transformer 60*a* becoming higher than the electric potential of the second terminal T2*a*, an induced voltage is generated in the first feedback winding 63*a* so that the electric potential of the fourth terminal T4*a* of the first transformer 60*a* becomes higher than the electric potential of the third terminal T3*a*. In this case, electric current is restricted by a first feedback diode 71*a* from flowing through the first feedback winding 63*a*; thus, magnetic energy is stored in the first input winding 61*a*. Further, upon the control switch 51 being turned from on to off, electric current is caused by the magnetic energy stored in the first input winding 61*a* to flow through the first feedback winding 63*a*. Moreover, as in the case of the first feedback winding 63*a*, upon the control switch 51 being turned from on to off, electric current is caused by the magnetic energy stored in the first input winding 61*a* to flow through the first output winding 62*a* as well.

A first terminal T1*b* of the second transformer 60*b* is connected with a second terminal T2*b* of the second transformer 60*b* via the second input winding 61*b*. A third terminal T3*b* of the second transformer 60*b* is connected with a fourth terminal T4*b* of the second transformer 60*b* via the second feedback winding 63*b*. Upon the control switch 51 being turned on and thereby the electric potential of the first terminal T1*b* of the second transformer 60*b* becoming higher than the electric potential of the second terminal T2*b*, an induced voltage is generated in the second feedback winding 63*b* so that the electric potential of the fourth terminal T4*b* of the second transformer 60*b* becomes higher than the electric potential of the third terminal T3*b*. In this case, electric current is restricted by a second feedback diode 71*b* from flowing through the second feedback winding 63*b*; thus, magnetic energy is stored in the second input winding 61*b*. Further, upon the control switch 51 being turned from on to off, electric current is caused by the magnetic energy stored in the second input winding 61*b* to flow through the second feedback winding 63*b*. Moreover, as in the case of the second feedback winding 63*b*, upon the control switch 51 being turned from on to off, electric current is caused by the magnetic energy stored in the second input winding 61*b* to flow through the second output winding 62*b* as well.

A first terminal T1*c* of the third transformer 60*c* is connected with a second terminal T2*c* of the third transformer 60*c* via the third input winding 61*c*. A third terminal T3*c* of the third transformer 60*c* is connected with a fourth terminal T4*c* of the third transformer 60*c* via the third feedback winding 63*c*. Upon the control switch 51 being turned on and thereby the electric potential of the first terminal T1*c* of the third transformer 60*c* becoming higher than the electric potential of the second terminal T2*c*, an induced voltage is generated in the third feedback winding 63*c* so that the electric potential of the fourth terminal T4*c* of the third transformer 60*c* becomes higher than the electric potential of the third terminal T3*c*. In this case, electric current is restricted by a third feedback diode 71*c* from flowing through the third feedback winding 63*c*; thus, magnetic energy is stored in the third input winding 61*c*. Further, upon the control switch 51 being turned from on to off, electric current is caused by the magnetic energy stored in the third input winding 61*c* to flow through the third feedback winding 63*c*. Moreover, as in the case of the third feedback winding 63*c*, upon the control switch 51 being turned from on to off, electric current is caused by the magnetic energy stored in the third input winding 61*c* to flow through the third output winding 62*c* as well.

A first terminal T1*d* of the fourth transformer 60*d* is connected with a second terminal T2*d* of the fourth transformer 60*d* via the fourth input winding 61*d*. A third terminal T3*d* of the fourth transformer 60*d* is connected with a fourth terminal T4*d* of the fourth transformer 60*d* via the fourth feedback winding 63*d*. Upon the control switch 51 being turned on and thereby the electric potential of the first terminal T1*d* of the fourth transformer 60*d* becoming higher than the electric potential of the second terminal T2*d*, an induced voltage is generated in the fourth feedback winding 63*d* so that the electric potential of the fourth terminal T4*d* of the fourth transformer 60*d* becomes higher than the electric potential of the third terminal T3*d*. In this case, electric current is restricted by a fourth feedback diode 71*d* from flowing through the fourth feedback winding 63*d*; thus, magnetic energy is stored in the fourth input winding 61*d*. Further, upon the control switch 51 being turned from on to off, electric current is caused by the magnetic energy stored in the fourth input winding 61*d* to flow through the fourth feedback winding 63*d*. Moreover, as in the case of the fourth feedback winding 63*d*, upon the control switch 51 being turned from on to off, electric current is caused by the magnetic energy stored in the fourth input winding 61*d* to flow through the fourth output winding 62*d* as well. In addition, in the present embodiment, the third terminals T3*a* to T3*d* of the first to fourth transformers 60*a* to 60*d* correspond to "current output terminals".

A first terminal T1*e* of the fifth transformer 60*e* is connected with a second terminal T2*e* of the fifth transformer 60*e* via the fifth input winding 61*e*.

Output terminals of the first transformer 60*a* are connected with the boost upper-arm drive circuit DCH via a first output diode 64*a* and a first output capacitor 65*a*. Output terminals of the second transformer 60*b* are connected with the U-phase upper-arm drive circuit DUH via a second output diode 64*b* and a second output capacitor 65*b*. Output terminals of the third transformer 60*c* are connected with the V-phase upper-arm drive circuit DVH via a third output diode 64*c* and a third output capacitor 65*c*. Output terminals of the fourth transformer 60*d* are connected with the W-phase upper-arm drive circuit DWH via a fourth output diode 64*d* and a fourth capacitor 65*d*. Output terminals of the fifth transformer 60*e* are connected with each of the lower-arm drive circuits DCL, DUL, DVL and DWL via a fifth output diode 64*e* and a fifth capacitor 65*e*.

The first terminals T1*a* to T1*e* of the transformers 60*a* to 60*e* are connected with a positive terminal of the low-voltage battery 42 via wires. Specifically, the first terminal T1*e* of the fifth transformer 60*e* is connected with the positive terminal of the low-voltage battery 42 via a fifth positive wire LPe. The first terminal T1*a* of the first transformer 60*a* is connected with the fifth positive wire LPe via a first positive wire LPa. That is, the first terminal T1*a* of the first transformer 60*a* is connected with the positive terminal of the low-voltage battery 42 via the first and fifth positive wires LPa and LPe. Similar to the first terminal T1*a* of the first transformer 60*a*, the first terminals T1*b* to T1*d* of the second to fourth transformers 60*b* to 60*d* are connected with the fifth positive wire LPe via corresponding second to fourth positive wires LPb to LPd. That is, the first terminals T1*b* to T1*d* of the second to fourth transformers 60*b* to 60*d* are connected with the positive terminal of the low-voltage battery 42 via the fifth positive wire LPe and the corresponding second to fourth positive wires LPb to LPd. In addition, a negative terminal of the low-voltage battery 42 is grounded.

The second terminals T2*a* to T2*e* of the transformers 60*a* to 60*e* are connected with a drain of the control switch 51 via wires. Specifically, the second terminal T2*a* of the first transformer 60*a* is connected with the drain of the control switch 51 via a first negative wire LNa. The second terminals T2*b* to T2*e* of the second to fifth transformers 60*b* to 60*e* are connected with the first negative wire LNa via corresponding second to fifth negative wires LNb to LNe. That is, the second terminals T2*b* to T2*e* of the second to fifth transformers 60*b* to 60*e* are connected with the drain of the control switch 51 via the first negative wire LNa and the corresponding second to fifth negative wires LNb to LNe. In addition, a source of the control switch 51 is grounded.

The third terminals T3*a* to T3*d* of the first to fourth transformers 60*a* to 60*d* are connected, via corresponding first to fourth feedback wires LRa to LRd, with an average value calculation unit 80 that is included in the isolated power supply apparatus 100. The first feedback diode 71*a* is provided to the first feedback wire LRa. Specifically, the first feedback diode 71*a* is provided in such a manner as to have its anode connected with the third terminal T3*a* of the first transformer 60*a* and its cathode connected with the average value calculation unit 80. The second feedback diode 71*b* is provided to the second feedback wire LRb. Specifically, the second feedback diode 71*b* is provided in such a manner as to have its anode connected with the third terminal T3*b* of the second transformer 60*b* and its cathode connected with the average value calculation unit 80. The third feedback diode 71*c* is provided to the third feedback wire LRc. Specifically, the third feedback diode 71*c* is provided in such a manner as to have its anode connected with the third terminal T3*c* of the third transformer 60*c* and its cathode connected with the average value calculation unit 80. The fourth feedback diode 71*d* is provided to the fourth feedback wire LRd. Specifically, the fourth feedback diode 71*d* is provided in such a manner as to have its anode connected with the third terminal T3*d* of the fourth transformer 60*d* and its cathode connected with the average value calculation unit 80. In addition, the average value calculation unit 80 will be described later.

The fourth terminal T4*a* of the first transformer 60*a* is grounded via a first ground wire LGa. The fourth terminal T4*b* of the second transformer 60*b* is grounded via a second ground wire LGb. The fourth terminal T4*c* of the third transformer 60*c* is grounded via a third ground wire LGc. A fourth terminal T4*d* of the fourth transformer 60*d* is grounded via a fourth ground wire LGd.

The isolated power supply apparatus 100 also includes first to fourth feedback capacitors 72*a* to 72*d*. The first feedback capacitor 72*a* connects the cathode of the first feedback diode 71*a* and the first ground wire LGa. The second feedback capacitor 72*b* connects the cathode of the second feedback diode 71*b* and the second ground wire LGb. The third feedback capacitor 72*c* connects the cathode of the third feedback diode 71*c* and the third ground wire LGc. The fourth feedback capacitor 72*d* connects the cathode of the fourth feedback diode 71*d* and the fourth ground wire LGd.

The power supply IC 50 is a single integrated circuit. The power supply IC 50 turns on and off the control switch 51 so as to feedback-control a feedback control value Vfb to a target value Vtg. In addition, in the present embodiment, the control switch 51 is turned on and off so that the feedback control value Vfb is feedback-controlled to the target value Vtg, thereby changing the voltages generated in the output windings 62*a* to 62*e* by an amount corresponding to the deviation value between the feedback control value Vfb and the target value Vtg.

Unlike in the present embodiment, a feedback winding may be provided in only one of the transformers 60*a* to 60*e*. In this case, the number of transformers whose output voltages are reflected in the feedback control value Vfb would be reduced due to the fact that only one of the transformers is provided with the feedback winding. Consequently, the voltages generated in the output windings of those of the transformers 60*a* to 60*e* which are not provided with the feedback winding might become excessively higher or excessively lower than a target output voltage. In addition, the target output voltage is set within a voltage range defined by an upper limit voltage and a lower limit voltage of the output windings 62*a* to 62*e*.

In view of the above, in the present embodiment, the first to fourth feedback windings 63*a* to 63*d* are provided respectively in the first to fourth transformers 60*a* to 60*d*; and the feedback control value Vfb is acquired based on the voltages generated in the first to fourth feedback windings 63*a* to 63*d*. Moreover, the power supply IC 50 turns on and off the control switch 51 so as to feedback-control the acquired feedback control value Vfb to the target value Vtg.

Specifically, an average control value, which correlates with an average value of the voltages generated in the first to fourth feedback windings 63*a* to 63*d*, is acquired as the feedback control value Vfb. The average value of the voltages generated in the first to fourth feedback windings 63*a* to 63*d* is calculated in the average value calculation unit 80. More specifically, the average value calculation unit 80 receives the voltages generated in the first to fourth feedback windings 63*a* to 63*d* as input values, and calculates the average value of the voltages generated in the first to fourth feedback windings 63*a* to 63*d*. Then, the power supply IC 50 acquires, based on an output value of the average value calculation unit 80, the feedback control value Vfb.

In the present embodiment, the average value calculation unit 80 includes first to fourth input resistors 81*a* to 81*d*, an operational amplifier 82 and a feedback resistor 83.

A first end of the first input resistor 81*a* is connected with the first feedback wire LRa; and a second end of the first input resistor 81*a* is connected with an inverting input terminal of the operational amplifier 82. A first end of the second input resistor 81*b* is connected with the second feedback wire LRb; and a second end of the second input resistor 81*b* is connected with the inverting input terminal of the operational amplifier 82. A first end of the third input resistor 81*c* is connected with the third feedback wire LRc; and a second end of the third input resistor 81*c* is connected with the inverting input terminal of the operational amplifier 82. A first end of the fourth input resistor 81*d* is connected with the fourth feedback wire LRd; and a second end of the fourth input resistor 81*d* is connected with the inverting input terminal of the operational amplifier 82. A non-inverting input terminal of the operational amplifier 82 is grounded. An output terminal of the operational amplifier 82 is connected with the inverting input terminal of the operational amplifier 82 via the feedback resistor 83. The resistance values of the first to fourth input resistors 81*a* to 81*d* are set to a predetermined value R0; and the resistance value of the feedback resistor 83 is set to R0/4.

The isolated power supply apparatus 100 also includes first and second voltage-dividing resistors 84 and 85. The output terminal of the operational amplifier 82 is connected with a first end of the first voltage-dividing resistor 84. A second end of the first voltage-dividing resistor 84 is connected with both a detection terminal Tfb1 of the power supply IC 50 and a first end of the second voltage-dividing resistor 85. A second end of the second voltage-dividing resistor 85 is grounded.

The divided-voltage value of the output voltage of the operational amplifier 82 is inputted to the power supply IC 50. The power supply IC 50 may acquire, as the feedback control value Vfb, a value obtained by inverting the sign of the inputted divided-voltage value. In this manner, the average control value of the voltages generated in the first to fourth feedback windings 63*a* to 63*d* is acquired. In addition, in the present embodiment, the power supply IC 50 and the average value calculation unit 80 together correspond to an "acquisition unit".

The power supply IC 50 acquires the average control value of the voltages generated in the first to fourth feedback windings 63*a* to 63*d* as the feedback control value Vfb, and turns on and off the control switch 51 so as to feedback-control the acquired average control value to the target value Vtg. In addition, in the present embodiment, the power supply IC 50 corresponds to a "control unit".

Figure 3:
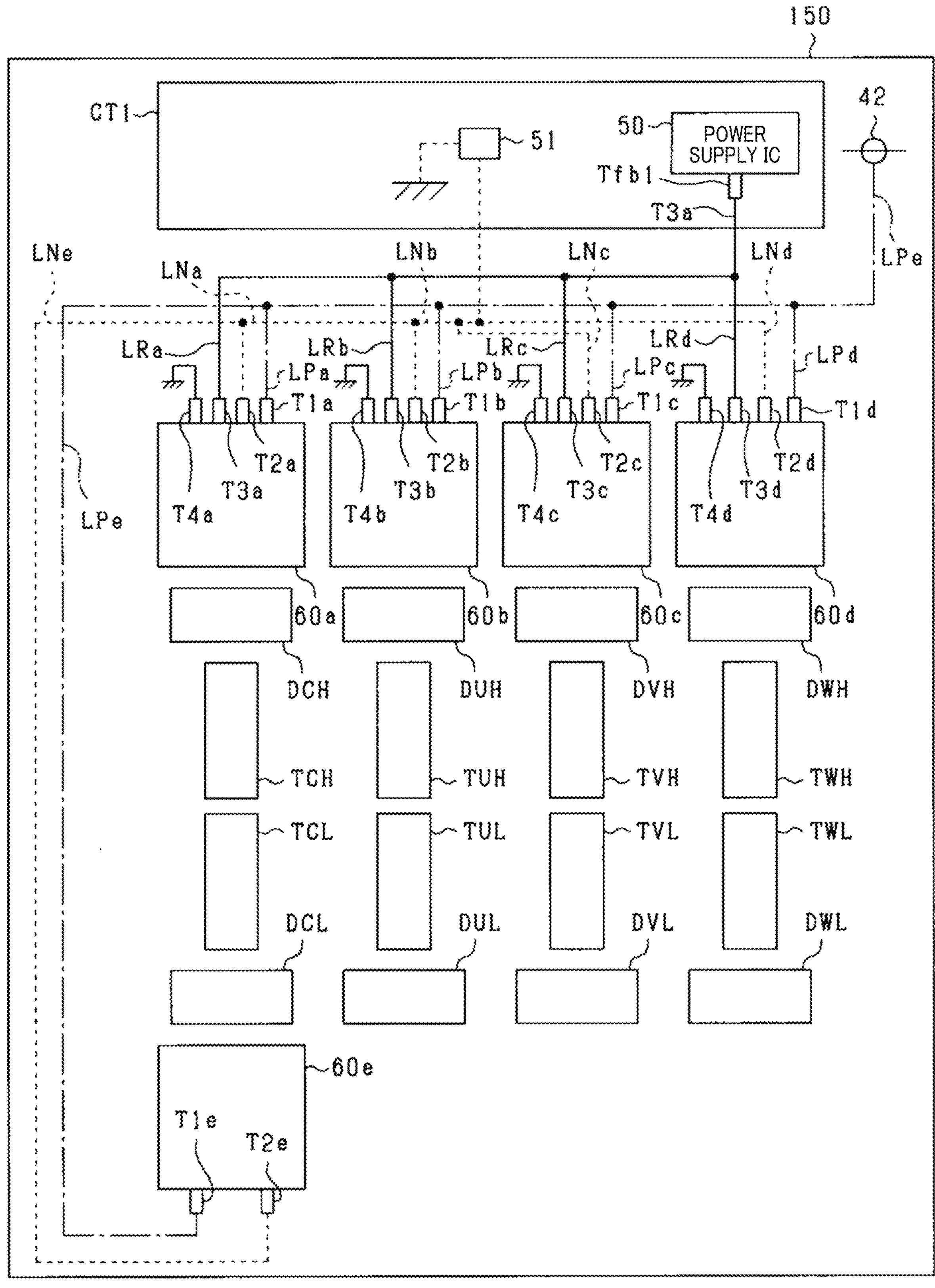
FIG. 3 is a plan view of a board to which the isolated power supply apparatus according to the first embodiment is mounted.

FIG. 3 is a diagram illustrating the arrangement of each component on a board 150 to which the switches SCH, SCL and SUH to SWL, the drive circuits DCH, DCL and DUH to DWL, and the isolated power supply apparatus 100 are mounted. It should be noted that in FIG. 3, the first to fourth feedback diodes 71*a* to 71*d*, the first to fourth feedback capacitors 72*a* to 72*d*, the average value calculation unit 80, and the first and second voltage-dividing resistors 84 and 85 are omitted from the illustration.

The board 150 is a rectangular multi-layer board which has a pair of outer layers and a plurality of inner layers sandwiched between the pair of outer layers. Specifically, the board 150 has, as the pair of outer layers, a first surface and a second surface that is on the back side of the first surface. On the first surface of the board 150, there are provided connection parts for connecting the switches SCH, SCL and SUH to SWL to the board 150. Specifically, a boost upper-arm connection part TCH connects the upper-arm boost switch SCH to the board 150; and a boost lower-arm connection part TCL connects the lower-arm boost switch SCL to the board 150. A U-phase upper-arm connection part TUH connects the U-phase upper-arm switch SUH to the board 150; and a U-phase lower-arm connection part TUL connects the U-phase lower-arm switch SUL to the board 150. A V-phase upper-arm connection part TVH connects the V-phase upper-arm switch SVH to the board 150; and a V-phase lower-arm connection part TVL connects the V-phase lower-arm switch SVL to the board 150. A W-phase upper-arm connection part TWH connects the W-phase upper-arm switch SWH to the board 150; and a W-phase lower-arm connection part TWL connects the W-phase lower-arm switch SWL to the board 150.

The boost upper-arm connection part TCH and the upper-arm connection parts TUH to TWH of the respective phases are provided on the board 150 such that they are aligned in a row in front view of the first surface of the board 150. Similarly, the boost lower-arm connection part TCL and the lower-arm connection parts TUL to TWL of the respective phases are provided on the board 150 such that they are aligned in a row in front view of the first surface of the board 150.

In front view of the first surface of the board 150, the first to fourth transformers 60*a* to 60*d*, which are the upper-arm transformers, are located in an area on the opposite side of the upper-arm connection parts TCH and TUH to TWH to the lower-arm connection parts TCL and TUL to TWL. Moreover, in front view of the first surface of the board 150, a power supply control unit CT1, which includes the power supply IC 50, the control switch 51 and the average value calculation unit 80, is located in an area on the opposite side of the first to fourth transformers 60*a* to 60*d* to the upper-arm connection parts TCH and TUH to TWH. In addition, the transformers 60*a* to 60*d* are provided such that the corresponding terminals T1*a* to T4*a*, T1*b* to T4*b*, T1*c* to T4*c* and T1*d* to T4*d* are adjacent to the power supply control unit CT1.

In front view of the first surface of the board 150, in an area between the upper-arm connection parts TCH and TUH to TWH that are aligned in a row and the first to fourth transformers 60*a* to 60*d* that are also aligned in a row, there are arranged the upper-arm drive circuits DCH and DUH to DWH in a row in the direction in which the upper-arm connection parts TCH and TUH to TWH are aligned.

The fifth transformer 60*e*, which is the sole lower-arm transformer, is located near the boost lower-arm connection part TCL in front view of the first surface of the board 150. Specifically, in front view of the first surface of the board 150, the fifth transformer 60*e* is located in an area on the opposite side of the boost lower-arm connection part TCL to the boost upper-arm connection part TCH. In addition, the fifth transformer 60*e* is provided such that the first and second terminals T1*e* and T2*e* face away from the boost lower-arm connection part TCL.

In front view of the first surface of the board 150, the lower-arm drive circuits DCL and DUL to DWL are arranged in a row in the direction in which the lower-arm connection parts TCL and TUL to TWL are aligned, and adjacent to the lower-arm connection parts TCL and TUL to TWL. In addition, the boost lower-arm drive circuit DCL is located in an area between the fifth transformer 60*e* and the boost lower-arm connection part TCL in front view of the first surface of the board 150.

With the above arrangement, the fifth transformer 60*e* is located further away from the power supply control unit CT1 than the first to fourth transformers 60*a* to 60*d* are in front view of the first surface of the board 150; the fifth transformer 60*e* is the sole lower-arm transformer, whereas the first to fourth transformers 60*a* to 60*d* are the upper-arm transformers. Consequently, the wires extending from the power supply control unit CT1 to the terminals of the fifth transformer 60*e* become longer than the wires extending from the power supply control unit CT1 to the terminals of the first to fourth transformers 60*a* to 60*d*. For example, the fifth positive wire LPe is longer than the first to fourth positive wires LPa to LPd; and the fifth negative wire LNe is longer than the first to fourth negative wires LNa to LNd.

According to the present embodiment, it is possible to achieve the following advantageous effects.

In the present embodiment, the feedback control value Vfb is acquired based on the voltages generated in the first to fourth feedback windings 63*a* to 63*d*. Consequently, it becomes possible to perform the feedback control with the feedback control value Vfb reflecting the voltages generated in more feedback windings than in the case of the feedback control value Vfb being acquired based on the voltage generated in a single feedback winding. Hence, it becomes possible to prevent the voltages generated in the first to fourth output windings 62*a* to 62*d* from becoming excessively higher or excessively lower than the target output voltage. As a result, it becomes possible to improve the controllability of the voltages generated in the first to fourth output windings 62*a* to 62*d*.

In the case of the first to fourth feedback windings 63*a* to 63*d* being provided in the first to fourth transformers 60*a* to 60*d*, the voltages generated in the first to fourth feedback windings 63*a* to 63*d* are reflected in the feedback control value Vfb. Therefore, the voltages generated in the first to fourth output windings 62*a* to 62*d* can be prevented from becoming excessively higher or excessively lower than the target output voltage. On the other hand, there is no feedback winding provided in the fifth transformer 60*e*. Therefore, when the amount of change in the voltages generated in the first to fourth output windings 62*a* to 62*d* during the feedback control is large, the voltage generated in the fifth output winding 62*e* may become excessively higher or excessively lower than the target output voltage.

In view of the above, in the present embodiment, the average control value of the voltages generated in the first to fourth feedback windings 63*a* to 63*d* is acquired as the feedback control value Vfb. Consequently, even if there is, among the first to fourth transformers 60*a* to 60*d*, a transformer in which the voltage generated in the output winding largely deviates from the target output voltage, the feedback control value Vfb can still be prevented from largely deviating from the target value Vtg. Hence, with the acquired feedback control value Vfb being feedback-controlled to the target value Vtg, increase in the amount of change in the voltages generated in the output windings 62*a* to 62*e* during the feedback control can be suppressed. As a result, in the fifth transformer 60*e* having no feedback winding as well as in the first to fourth transformers 60*a* to 60*d*, the voltages generated in the output windings 62*a* to 62*e* can be prevented from becoming excessively higher or excessively lower than the target output voltage.

One may consider providing feedback windings in, among the transformers 60*a* to 60*e*, at least two transformers including the fifth transformer 60*e* and acquiring the feedback control value Vfb based on the voltages generated in the feedback windings. However, in this case, it would become necessary to provide a feedback wire connected with the fifth transformer 60*e*; thus, the total length of the wires provided in the isolated power supply apparatus 100 would be increased. Consequently, the amount of voltage drop in the wires might be increased and/or noise might be superimposed on electric current flowing through the wires.

In view of the above, in the present embodiment, the first to fourth feedback windings 63*a* to 63*d* are provided respectively in the first to fourth transformers 60*a* to 60*d*. Consequently, it becomes possible to prevent the feedback wires provided in the isolated power supply apparatus 100 from becoming long. Moreover, since the average control value of the voltages generated in the first to fourth feedback windings 63*a* to 63*d* is acquired as the feedback control value Vfb, it also becomes possible to suppress increase in the amount of change in the voltage generated in the fifth output winding 62*e* of the fifth transformer 60*e* that has no feedback winding. As a result, it becomes possible to suppress increase in the amount of change in the voltages generated in the output windings 62*a* to 62*e* during the feedback control while suppressing increase in the amount of voltage drop in the wires provided in the isolated power supply apparatus 100 and superimposition of noise on electric current flowing through the wires.

Second Embodiment

Hereinafter, the second embodiment will be described with reference to the drawings, focusing on the differences thereof from the first embodiment.

An overvoltage abnormality is most likely to occur in that one of the transformers 60*a* to 60*e* whose output voltage is highest. Therefore, in the case of the first to fourth feedback windings 63*a* to 63*d* being provided respectively in the first to fourth transformers 60*a* to 60*d*, it may be desirable to acquire, as the feedback control value Vfb, the voltage generated in the feedback winding provided in that one of the first to fourth transformers 60*a* to 60*d* whose output voltage is highest.

In view of the above, in the present embodiment, a maximum control value, which correlates with a maximum value of the voltages generated in the first to fourth feedback windings 63*a* to 63*d*, is acquired instead of the average control value of the voltages generated in the first to fourth feedback windings 63*a* to 63*d*.

To acquire the maximum control value of the voltages generated in the first to fourth feedback windings 63*a* to 63*d*, one may consider adding to the isolated power supply apparatus 100 a circuit that performs a calculation process for calculating the maximum value of the voltages generated in the first to fourth feedback windings 63*a* to 63*d*. However, in this case, the number of parts of the isolated power supply apparatus 100 would be increased.

Figure 4:
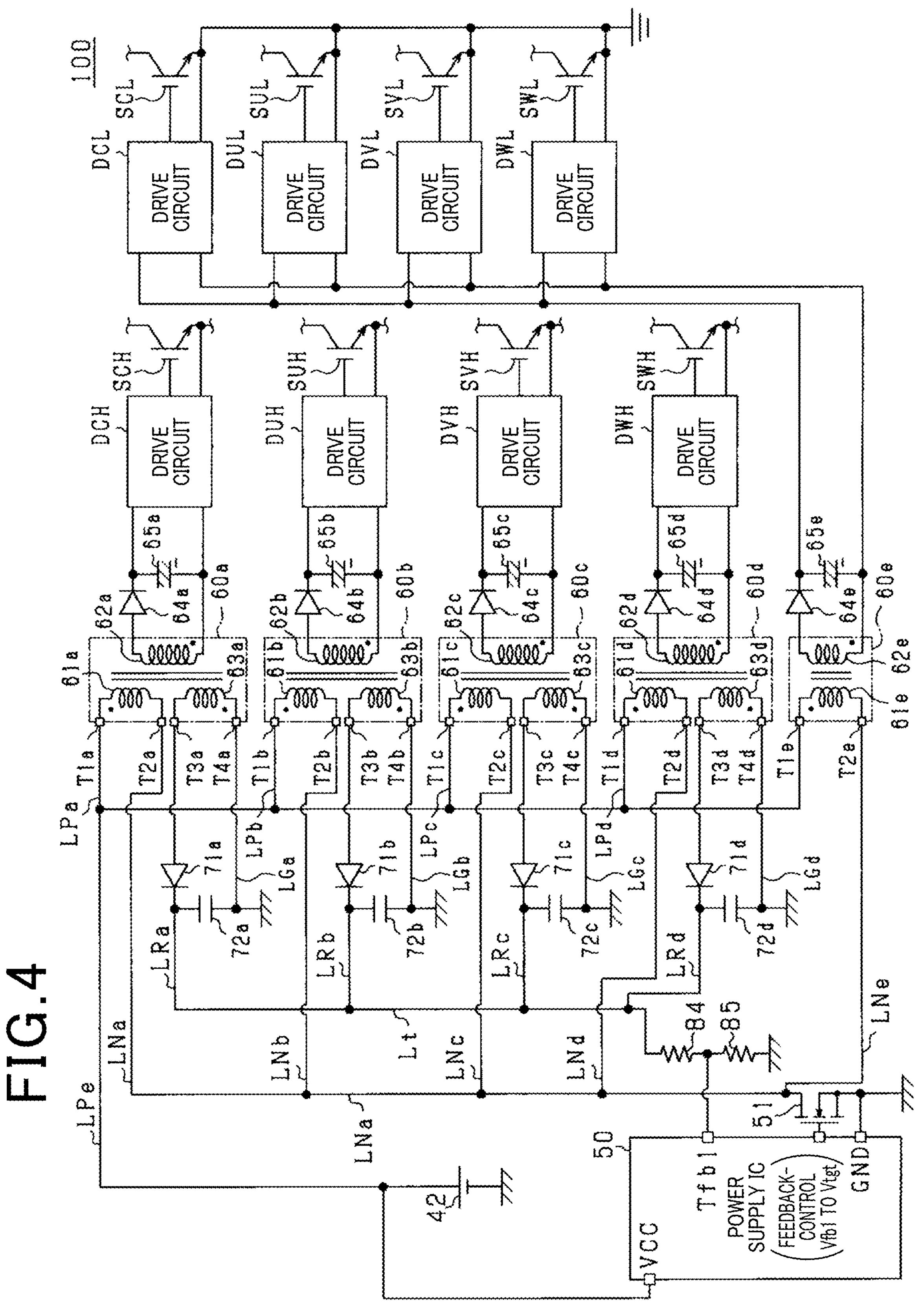
FIG. 4 is a diagram illustrating the configuration of an isolated power supply apparatus according to a second embodiment.

In view of the above, in the present embodiment, as shown in FIG. 4, the maximum control value of the voltages generated in the first to fourth feedback windings 63*a* to 63*d* is acquired by connecting the first to fourth feedback windings 63*a* to 63*d* in parallel to each other. Specifically, in the present embodiment, the isolated power supply apparatus 100 includes a common wire Lt that is connected with the first end of the first voltage-dividing resistor 84. The first feedback wire LRa is connected with the common wire Lt, instead of being connected with the first end of the first input resistor 81*a* of the average value calculation unit 80 as in the first embodiment. The second feedback wire LRb is also connected with the common wire Lt, instead of being connected with the first end of the second input resistor 81*b* of the average value calculation unit 80 as in the first embodiment. The third feedback wire LRc is also connected with the common wire Lt, instead of being connected with the first end of the third input resistor 81*c* of the average value calculation unit 80 as in the first embodiment. The fourth feedback wire LRd is also connected with the common wire Lt, instead of being connected with the first end of the fourth input resistor 81*d* of the average value calculation unit 80 as in the first embodiment. The voltage of the common wire Lt is inputted to the power supply IC 50 via the first and second voltage-dividing resistors 84 and 85.

With the above configuration, the voltage generated in the first feedback winding 63*a* is inputted to the power supply IC 50 via the first feedback diode 71*a* provided to the first feedback wire LRa. The voltage generated in the second feedback winding 63*b* is inputted to the power supply IC 50 via the second feedback diode 71*b* provided to the second feedback wire LRb. The voltage generated in the third feedback winding 63*c* is inputted to the power supply IC 50 via the third feedback diode 71*c* provided to the third feedback wire LRc. The voltage generated in the fourth feedback winding 63*d* is inputted to the power supply IC 50 via the fourth feedback diode 71*d* provided to the fourth feedback wire LRd. The first to fourth feedback diodes 71*a* to 71*d* are provided in such a manner as to allow electric current to flow from the corresponding feedback windings 63*a* to 63*d* to the power supply IC 50. Therefore, electric current flows from that one of the feedback windings 63*a* to 63*d* where the highest voltage is generated to the power supply IC 50. As a result, in the power supply IC 50, the maximum control value is acquired which results from the division of the maximum value of the voltages generated in the first to fourth feedback windings 63*a* to 63*d* by the first and second voltage-dividing resistors 84 and 85.

According to the present embodiment, it is possible to achieve the following advantageous effects.

In the present embodiment, the maximum control value of the voltages generated in the first to fourth feedback windings 63*a* to 63*d* is acquired as the feedback control value Vfb. Then, the acquired feedback control value Vfb is feedback-controlled to the target value Vtg. Consequently, among the first to fourth transformers 60*a* to 60*d*, the transformer which includes that one of the first to fourth output windings 62*a* to 62*d* where the highest voltage is generated becomes the target of the feedback control. As a result, it becomes possible to prevent an overvoltage abnormality from occurring in the first to fourth transformers 60*a* to 60*d*.

In the present embodiment, the maximum control value of the voltages generated in the first to fourth feedback windings 63*a* to 63*d* is acquired by connecting the first to fourth feedback windings 63*a* to 63*d* in parallel to each other. Consequently, it becomes possible to acquire the maximum control value of the voltages generated in the first to fourth feedback windings 63*a* to 63*d* while suppressing increase in the number of parts of the isolated power supply apparatus 100, compared to the case of adding to the isolated power supply apparatus 100 a circuit that calculates the maximum value of the voltages generated in the first to fourth feedback windings 63*a* to 63*d*.

Situations may happen where an open circuit fault occurs in the feedback windings, making it impossible to continue the feedback control. In this regard, in the present embodiment, the first to fourth feedback windings 63*a* to 63*d* are provided respectively in the first to fourth transformers 60*a* to 60*d*. Consequently, even if an open circuit fault occurs in one of the first to fourth feedback windings 63*a* to 63*d*, the feedback control can still be continued by acquiring the maximum control value of the voltages generated in those of the first to fourth feedback windings 63*a* to 63*d* which are in a normal condition.

In the present embodiment, the first to fourth feedback windings 63*a* to 63*d* are provided respectively in the first to fourth transformers 60*a* to 60*d* as in the first embodiment. Consequently, it becomes possible to prevent an overvoltage abnormality from occurring in the first to fourth transformers 60*a* to 60*d* while suppressing increase in the amount of voltage drop in the wires provided in the isolated power supply apparatus 100 and superimposition of noise on electric current flowing through the wires.

Third Embodiment

Hereinafter, the third embodiment will be described with reference to the drawings, focusing on the differences thereof from the first embodiment.

In the case of the feedback control value Vfb being acquired based on the voltages generated in the first to fourth feedback windings 63*a* to 63*d*, the amount of change in the feedback control value Vfb may become large due to load fluctuation in the upper-arm drive circuits DCH and DUH to DWH. In this case, the amount of change in the voltages generated in the output windings 62*a* to 62*e* during the feedback control may become large. Therefore, it may be desirable to reduce the amount of change in the voltages generated in the output windings 62*a* to 62*e* during the feedback control with respect to the amount of change in the feedback control value Vfb.

In view of the above, in the present embodiment, instead of acquiring the average control value of the voltages generated in the first to fourth feedback windings 63*a* to 63*d*, a total control value, which correlates with the sum of the voltages generated in the first to fourth feedback windings 63*a* to 63*d*, is acquired as the feedback control value Vfb.

To acquire the total control value of the voltages generated in the first to fourth feedback windings 63*a* to 63*d*, one may consider adding to the isolated power supply apparatus 100 a circuit that performs a calculation process for calculating the sum of the voltages generated in the first to fourth feedback windings 63*a* to 63*d*. However, in this case, the number of parts of the isolated power supply apparatus 100 would be increased.

Figure 5:
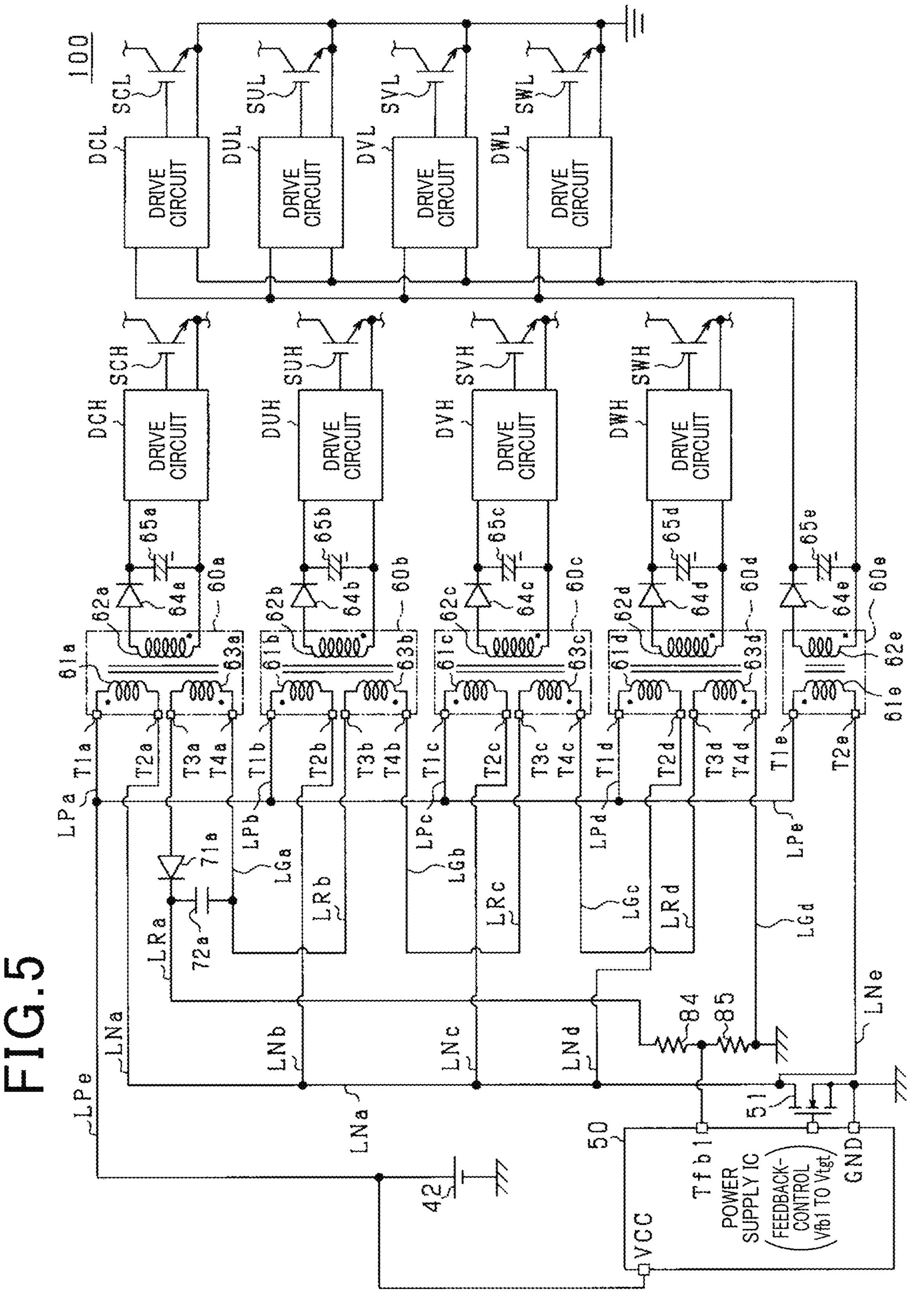
FIG. 5 is a diagram illustrating the configuration of an isolated power supply apparatus according to a third embodiment.

In view of the above, in the present embodiment, as shown in FIG. 5, the total control value of the voltages generated in the first to fourth feedback windings 63*a* to 63*d* is acquired by connecting the first to fourth feedback windings 63*a* to 63*d* in series with each other. Specifically, in the present embodiment, the first feedback wire LRa is connected with the first end of the first voltage-dividing resistor 84, instead of being connected with the first end of the first input resistor 81*a* of the average value calculation unit 80 as in the first embodiment. The first ground wire LGa is connected with the second feedback wire LRb, instead of being grounded as in the first embodiment. The second ground wire LGb is connected with the third feedback wire LRc, instead of being grounded as in the first embodiment. The third ground wire LGc is connected with the fourth feedback wire LRd, instead of being grounded as in the first embodiment. The fourth ground wire LGd is connected with both the second end of the second voltage-dividing resistor 85 and the ground. The voltage of the first feedback wire LRa is inputted to the power supply IC 50 via the first and second voltage-dividing resistors 84 and 85.

In addition, in the present embodiment, the isolated power supply apparatus 100 does not include the second to fourth feedback diodes 71*b* to 71*d* and the second to fourth feedback capacitors 72*b* to 72*d*.

With the above configuration, since the first to fourth feedback windings 63*a* to 63*d* are connected in series with each other, the sum of the voltages generated in the first to fourth feedback windings 63*a* to 63*d* is produced between the third terminal T3*a* of the first transformer 60*a* and the fourth terminal T4*d* of the fourth transformer 60*d*. The power supply IC 50 acquires, as the feedback control value Vfb, the total control value that results from the division of the sum of the voltages generated in the first to fourth feedback windings 63*a* to 63*d* by the first and second voltage-dividing resistors 84 and 85. Then, the power supply IC 50 turns on and off the control switch 51 so as to feedback-control the acquired feedback control value Vfb to the target value Vtg. More particularly, in the present embodiment, the control switch 51 is turned on and off so that the feedback control value Vfb is feedback-controlled to the target value Vtg, thereby changing the voltages generated in the output windings 62*a* to 62*e* by an amount corresponding to one-fourth of the deviation value between the feedback control value Vfb and the target value Vtg.

According to the present embodiment, it is possible to achieve the following advantageous effects.

In the present embodiment, the total control value of the voltages generated in the first to fourth feedback windings 63*a* to 63*d* is acquired as the feedback control value Vfb. Then, the acquired feedback control value Vfb is feedback-controlled to the target value Vtg. Specifically, in order to feedback-control the feedback control value Vfb to the target value Vtg, the control switch 51 is turned on and off in such as manner as to change the voltages generated in the output windings 62*a* to 62*e* by an amount corresponding to one-fourth of the deviation value between the feedback control value Vfb and the target value Vtg. Consequently, it becomes possible to reduce the amount of change in the voltages generated in the output windings 62*a* to 62*e* during the feedback control with respect to the amount of change in the feedback control value Vfb. As a result, it becomes possible to prevent the voltages generated in the output windings 62*a* to 62*e* from becoming excessively higher or excessively lower than the target output voltage.

In the present embodiment, the total control value of the voltages generated in the first to fourth feedback windings 63*a* to 63*d* is acquired by connecting the first to fourth feedback windings 63*a* to 63*d* in series with each other. Consequently, it becomes possible to acquire the total control value of the voltages generated in the first to fourth feedback windings 63*a* to 63*d* while suppressing increase in the number of parts of the isolated power supply apparatus 100.

In the present embodiment, the first to fourth feedback windings 63*a* to 63*d* are provided respectively in the first to fourth transformers 60*a* to 60*d* as in the first embodiment. Consequently, it becomes possible to reduce the amount of change in the voltages generated in the output windings 62*a* to 62*e* during the feedback control with respect to the amount of change in the feedback control value Vfb, while suppressing increase in the amount of voltage drop in the wires provided in the isolated power supply apparatus 100 and superimposition of noise on electric current flowing through the wires.

Fourth Embodiment

Hereinafter, the fourth embodiment will be described with reference to the drawings, focusing on the differences thereof from the first embodiment.

In the case of a feedback winding being provided in only one of the transformers 60_a_ to 60_e_, the output voltages of the transformers 60_a_ to 60_e_ may change significantly due to load fluctuation in the drive circuit(s) connected with the transformer in which the feedback winding is provided. Specifically, when the drive circuit(s) stop(s) operating or operate(s) under a high load, the output voltage of the transformer connected with the drive circuit(s) may change significantly. Moreover, the fifth output winding 62_e_ of the fifth transformer 60_e_ is connected with four drive circuits, whereas each of the first to fourth output windings 62_a_ to 62_d_ of the first to fourth transformers 60_a_ to 60_d_ is connected with a single drive circuit. Therefore, in the fifth transformer 60_e_, overall load fluctuation in the four drive circuits connected with the fifth output winding 62_e_ may be reduced compared to the first to fourth transformers 60_a_ to 60_d_. Therefore, it may be desirable to set, among the transformers 60_a_ to 60_e_, the fifth transformer 60_e_ which has the maximum number of drive circuits connected with the output winding thereof as the target of the feedback control.

In view of the above, in the present embodiment, a feedback winding is provided in only the fifth transformer 60_e_ which has the maximum number of drive circuits connected with the output winding thereof among the transformers 60_a_ to 60_e_. In addition, in the present embodiment, the fifth transformer 60_e_ corresponds to a "specific transformer".

Figure 6:
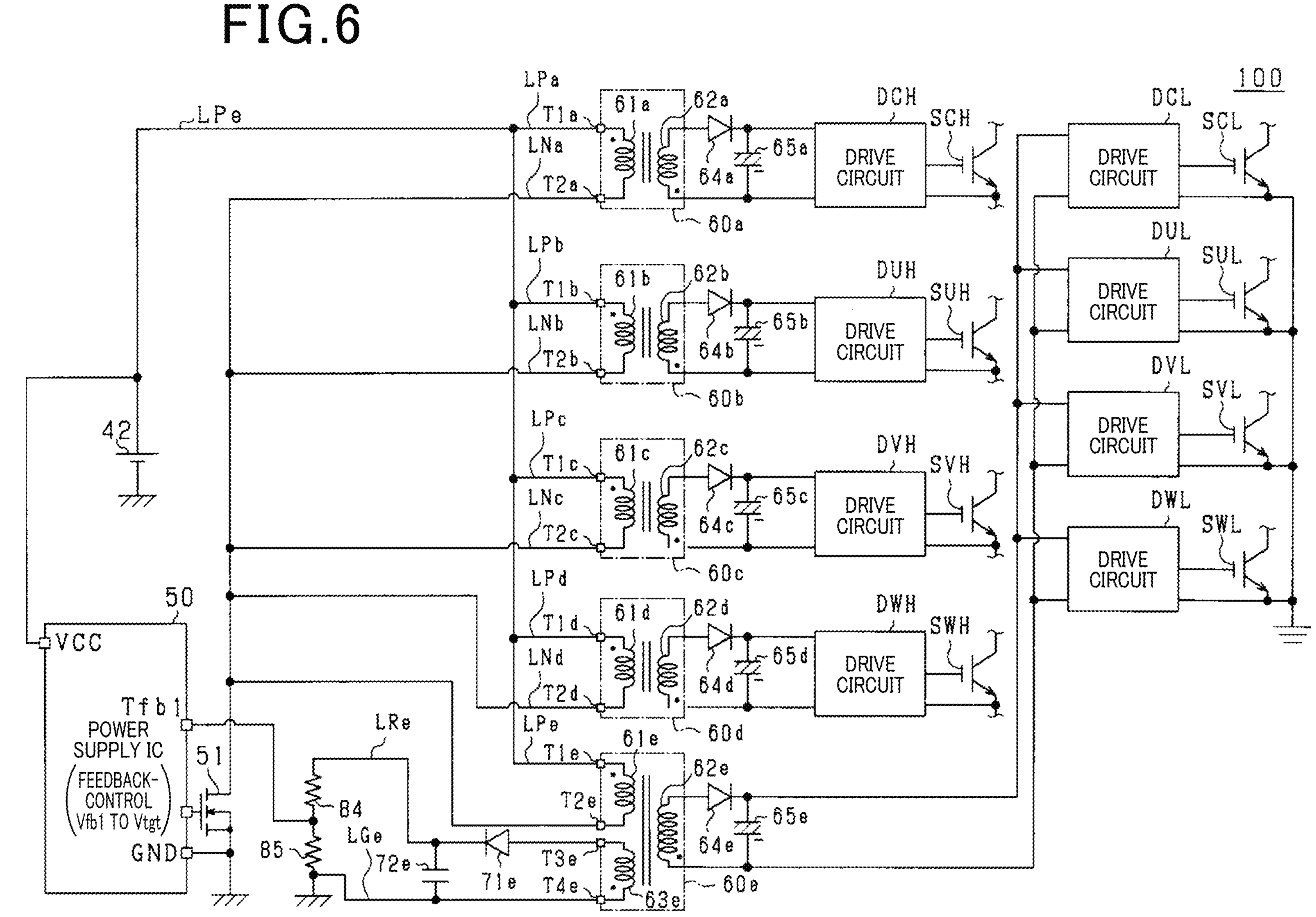
FIG. 6 is a diagram illustrating the configuration of an isolated power supply apparatus according to a fourth embodiment.

Specifically, in the present embodiment, as shown in FIG. 6, the fifth transformer 60_e_ includes a fifth feedback winding 63_e_. The fifth feedback winding 63_e_ is wound, together with the fifth input winding 61_e_ and the fifth output winding 62_e_, around a common core; and the fifth input winding 61_e_, the fifth output winding 62_e_ and the fifth feedback winding 63_e_ are magnetically coupled by the common core.

A third terminal T3_e_ of the fifth transformer 60_e_ is connected with a fourth terminal T4_e_ of the fifth transformer 60_e_ via the fifth feedback winding 63_e_. The third terminal T3_e_ of the fifth transformer 60_e_ is also connected with the first end of the first voltage-dividing resistor 84 via a fifth feedback wire LRe. The fourth terminal T4_e_ of the fifth transformer 60_e_ is connected, via a fifth ground wire LGe, with both the second end of the second voltage-dividing resistor 85 and the ground.

A fifth feedback diode 71_e_ is provided to the fifth feedback wire LRe. Specifically, the fifth feedback diode 71_e_ is provided in such a manner as to have its anode connected with the third terminal T3_e_ of the fifth transformer 60_e_ and its cathode connected with the first end of the first voltage-dividing resistor 84. Moreover, the cathode of the fifth feedback diode 71_e_ and the fifth ground wire LGe are connected by a fifth feedback capacitor 72_e_.

With the above configuration, the voltage generated in the fifth feedback winding 63_e_ is inputted to the power supply IC 50 via the first and second voltage-dividing resistors 84 and 85. Consequently, the divided-voltage value of the voltage generated in the fifth feedback winding 63_e_ is acquired as the feedback control value Vfb.

According to the present embodiment, the fifth feedback winding 63_e_ is provided in the fifth transformer 60_e_ which has the maximum number of drive circuits connected therewith among the transformers 60_a_ to 60_e_. Consequently, compared to the case of a feedback winding being provided in one of the first to fourth transformers 60_a_ to 60_d_, it becomes possible to suppress overall load fluctuation in the drive circuits DCL and DUL to DWL connected with the fifth output winding 62_e_, thereby suppressing change in the voltage generated in the fifth output winding 62_e_. Thus, it also becomes possible to suppress change in the voltage generated in the fifth feedback winding 63_e_, thereby suppressing change in the feedback control value Vfb. Hence, it becomes possible to suppress the deviation of the feedback control value Vfb from the target value Vtg, thereby suppressing increase in the amount of change in the voltages generated in the output windings 62_a_ to 62_e_ during the feedback control. As a result, it becomes possible to prevent the voltages generated in the output windings 62_a_ to 62_e_ from becoming excessively higher or excessively lower than the target output voltage, thereby improving the controllability of the voltages generated in the output windings 62_a_ to 62_e_.

Other Embodiments

The above-described embodiments may be implemented through the following modifications.

In the first to third embodiments, the first to fourth feedback windings 63_a_ to 63_d_ are provided respectively in the first to fourth transformers 60_a_ to 60_d_. However, the present disclosure is not limited to this configuration. For example, four feedback windings may be provided respectively in, among the transformers 60_a_ to 60_e_, four transformers including the fifth transformer 60_e_. Moreover, two or three feedback windings may be provided respectively in any two or three of the transformers 60_a_ to 60_e_. Alternatively, each of the transformers 60_a_ to 60_e_ may have a feedback winding provided therein.

In the first embodiment, the isolated power supply apparatus 100 may not include the first and second voltage-dividing resistors 84 and 85. In this case, the output voltage of the operational amplifier 82 would be inputted to the power supply IC 50. Consequently, the average value of the voltages generated in the first to fourth feedback windings 63_a_ to 63_d_ would be acquired as the feedback control value Vfb.

In the second embodiment, the isolated power supply apparatus 100 may not include the first and second voltage-dividing resistors 84 and 85. In this case, the voltage of the common wire Lt would be inputted to the power supply IC 50. Consequently, the maximum value of the voltages generated in the first to fourth feedback windings 63_a_ to 63_d_ would be acquired as the feedback control value Vfb.

In the third embodiment, the isolated power supply apparatus 100 may not include the first and second voltage-dividing resistors 84 and 85. In this case, the voltage of the first feedback wire LRa would be inputted to the power supply IC 50. Consequently, the sum of the voltages generated in the first to fourth feedback windings 63_a_ to 63_d_ that are connected in series with each other would be acquired as the feedback control value Vfb.

The application of the isolated power supply apparatus 100 is not limited to the inverter 12 and the boost converter 30. For example, the isolated power supply apparatus 100 may alternatively be applied to other electric power conversion circuits, such as a half-bridge circuit or a full-bridge circuit. Moreover, the switches SCH, SCL and SUH to SWL constituting the inverter 12 and the boost converter 30 are not limited to IGBTs, but may alternatively be implemented by, for example, MOSFETs.

The power supply targets to which the output voltages of the transformers 60_a_ to 60_e_ are supplied are not limited to the drive circuits DCH, DCL and DUH to DWL, but may alternatively be general electrical loads. Specific examples of general electrical loads may include seat heaters, heaters for rear window defrosters, headlights, windshield wipers and air conditioner fans.

The object in which the isolated power supply apparatus 100 is installed is not limited to a vehicle, but may alternatively be, for example, an aircraft or a ship. Furthermore, the object in which the isolated power supply apparatus 100 is installed is not limited to a mobile object such a vehicle, an aircraft or a ship.

While the present disclosure has been described pursuant to the embodiments, it should be appreciated that the present disclosure is not limited to the embodiments and the structures. Instead, the present disclosure encompasses various modifications and changes within equivalent ranges. In addition, various combinations and modes are also included in the category and the scope of technical idea of the present disclosure.

What is claimed is:

1. An isolated power supply apparatus comprising:

a plurality of transformers;

a control switch;

an acquisition unit; and a control unit, wherein input sides of the transformers are connected with a DC power source and output sides of the transformers are connected with power supply targets corresponding to the transformers, at least two of the transformers have respective feedback windings, the control switch is configured to allow supply of electric power from the DC power source to the input sides of the transformers by being turned on and interrupt the supply of electric power from the DC power source to the input sides of the transformers by being turned off, the acquisition unit is configured to acquire, based on voltages generated in the feedback windings, a control value for feedback control, and the control unit is configured to turn on and off the control switch so as to feedback-control the control value to a target value and thereby control voltages on the output sides of the transformers, wherein the acquisition unit is configured to acquire, as the control value, a maximum control value that is either a maximum value of the voltages generated in the feedback windings or a correlation value of the maximum value, and the control unit is configured to turn on and off the control switch so as to feedback-control the maximum control value to the target value, wherein the isolated power supply apparatus further comprises:

feedback wires provided respectively corresponding to the feedback windings;

a common wire connected with first ends of the feedback wires; and diodes each of which is provided to a corresponding one of the feedback wires, wherein each of the feedback windings has two ends one of which constitutes a current output terminal and the other of which is grounded, second ends of the feedback wires are connected respectively with the current output terminals of the corresponding feedback windings, each of the diodes has its anode oriented toward the current output terminal of a corresponding one of the feedback windings, and the acquisition unit is configured to acquire, as the maximum control value, a voltage value inputted thereto from the common wire.

2. The isolated power supply apparatus as set forth in claim 1, wherein at least three of the transformers have the respective feedback windings.

3. The isolated power supply apparatus as set forth in claim 1, wherein the isolated power supply apparatus is applied to a system comprising:

an electric power conversion circuit having upper-arm switches and lower-arm switches;

upper-arm drive circuits each of which is one of the power supply targets and configured to drive a corresponding one of the upper-arm switches;

lower-arm drive circuits each of which is one of the power supply targets and configured to drive a corresponding one of the lower-arm switches; and a board to which the upper-arm and lower-arm switches, the upper-arm and lower-arm drive circuits and the isolated power supply apparatus are mounted, wherein the transformers include:

upper-arm transformers each of which is provided on the board and has the input side thereof connected with the DC power source and the output side thereof connected with a corresponding one of the upper-arm drive circuits; and a lower-arm transformer that is provided on the board and has the input side thereof connected with the DC power source and the output side thereof connected with the lower-arm drive circuits, wherein the isolated power supply apparatus further comprises an integrated circuit that is provided on the board and includes the acquisition unit and the control unit, the upper-arm transformers are located adjacent to the integrated circuit in front view of a board surface of the board, the lower-arm transformer is located further away from the integrated circuit than the upper-arm transformers are in front view of the board surface of the board, and of the upper-arm transformers and the lower-arm transformer, at least two upper-arm transformers have the respective feedback windings.

4. An isolated power supply apparatus comprising:

a plurality of transformers;

a control switch;

an acquisition unit; and a control unit, wherein input sides of the transformers are connected with a DC power source and output sides of the transformers are connected with power supply targets corresponding to the transformers, at least two of the transformers have respective feedback windings, the control switch is configured to allow supply of electric power from the DC power source to the input sides of the transformers by being turned on and interrupt the supply of electric power from the DC power source to the input sides of the transformers by being turned off, the acquisition unit is configured to acquire, based on voltages generated in the feedback windings, a control value for feedback control, and the control unit is configured to turn on and off the control switch so as to feedback-control the control value to a target value and thereby control voltages on the output sides of the transformers, wherein the acquisition unit is configured to acquire, as the control value, a total control value that is either a sum of the voltages generated in the feedback windings or a correlation value of the sum, and the control unit is configured to turn on and off the control switch so as to feedback-control the total control value to the target value, wherein the isolated power supply apparatus further comprises electrical paths that connect the feedback windings in series with each other, and the acquisition unit is configured to acquire, as the total control value, a voltage value inputted thereto from the electrical paths.

5. The isolated power supply apparatus as set forth in claim 4, wherein the isolated power supply apparatus is applied to a system comprising:

an electric power conversion circuit having upper-arm switches and lower-arm switches;

upper-arm drive circuits each of which is one of the power supply targets and configured to drive a corresponding one of the upper-arm switches;

lower-arm drive circuits each of which is one of the power supply targets and configured to drive a corresponding one of the lower-arm switches; and a board to which the upper-arm and lower-arm switches, the upper-arm and lower-arm drive circuits and the isolated power supply apparatus are mounted, wherein the transformers include:

upper-arm transformers each of which is provided on the board and has the input side thereof connected with the DC power source and the output side thereof connected with a corresponding one of the upper-arm drive circuits; and a lower-arm transformer that is provided on the board and has the input side thereof connected with the DC power source and the output side thereof connected with the lower-arm drive circuits, wherein the isolated power supply apparatus further comprises an integrated circuit that is provided on the board and includes the acquisition unit and the control unit, the upper-arm transformers are located adjacent to the integrated circuit in front view of a board surface of the board, the lower-arm transformer is located further away from the integrated circuit than the upper-arm transformers are in front view of the board surface of the board, and of the upper-arm transformers and the lower-arm transformer, at least two upper-arm transformers have the respective feedback windings.

6. An isolated power supply apparatus comprising:

a plurality of transformers;

a control switch;

an acquisition unit; and a control unit, wherein input sides of the transformers are connected with a DC power source and output sides of the transformers are connected with power supply targets corresponding to the transformers, at least two of the transformers have respective feedback windings, the control switch is configured to allow supply of electric power from the DC power source to the input sides of the transformers by being turned on and interrupt the supply of electric power from the DC power source to the input sides of the transformers by being turned off, the acquisition unit is configured to acquire, based on voltages generated in the feedback windings, a control value for feedback control, and the control unit is configured to turn on and off the control switch so as to feedback-control the control value to a target value and thereby control voltages on the output sides of the transformers, wherein the acquisition unit is configured to acquire, as the control value, an average control value that is either an average value of the voltages generated in the feedback windings or a correlation value of the average value, and the control unit is configured to turn on and off the control switch so as to feedback-control the average control value to the target value, wherein the isolated power supply apparatus is applied to a system comprising:

an electric power conversion circuit having upper-arm switches and lower-arm switches;

upper-arm drive circuits each of which is one of the power supply targets and configured to drive a corresponding one of the upper-arm switches;

lower-arm drive circuits each of which is one of the power supply targets and configured to drive a corresponding one of the lower-arm switches; and a board to which the upper-arm and lower-arm switches, the upper-arm and lower-arm drive circuits and the isolated power supply apparatus are mounted, wherein the transformers include:

upper-arm transformers each of which is provided on the board and has the input side thereof connected with the DC power source and the output side thereof connected with a corresponding one of the upper-arm drive circuits; and a lower-arm transformer that is provided on the board and has the input side thereof connected with the DC power source and the output side thereof connected with the lower-arm drive circuits, wherein the isolated power supply apparatus further comprises an integrated circuit that is provided on the board and includes the acquisition unit and the control unit, the upper-arm transformers are located adjacent to the integrated circuit in front view of a board surface of the board, the lower-arm transformer is located further away from the integrated circuit than the upper-arm transformers are in front view of the board surface of the board, and of the upper-arm transformers and the lower-arm transformer, at least two upper-arm transformers have the respective feedback windings.

7. An isolated power supply apparatus comprising:

a plurality of transformers;

a control switch;

an acquisition unit; and a control unit, wherein input sides of the transformers are connected with a DC power source and output sides of the transformers are connected with power supply targets corresponding to the transformers, at least two of the transformers have respective feedback windings, the control switch is configured to allow supply of electric power from the DC power source to the input sides of the transformers by being turned on and interrupt the supply of electric power from the DC power source to the input sides of the transformers by being turned off, the acquisition unit is configured to acquire, based on voltages generated in the feedback windings, a control value for feedback control, and the control unit is configured to turn on and off the control switch so as to feedback-control the control value to a target value and thereby control voltages on the output sides of the transformers, wherein the acquisition unit is configured to acquire, as the control value, a maximum control value that is either a maximum value of the voltages generated in the feedback windings or a correlation value of the maximum value, and the control unit is configured to turn on and off the control switch so as to feedback-control the maximum control value to the target value, wherein the isolated power supply apparatus is applied to a system comprising:

an electric power conversion circuit having upper-arm switches and lower-arm switches;

upper-arm drive circuits each of which is one of the power supply targets and configured to drive a corresponding one of the upper-arm switches;

lower-arm drive circuits each of which is one of the power supply targets and configured to drive a corresponding one of the lower-arm switches; and a board to which the upper-arm and lower-arm switches, the upper-arm and lower-arm drive circuits and the isolated power supply apparatus are mounted, wherein the transformers include:

upper-arm transformers each of which is provided on the board and has the input side thereof connected with the DC power source and the output side thereof connected with a corresponding one of the upper-arm drive circuits; and a lower-arm transformer that is provided on the board and has the input side thereof connected with the DC power source and the output side thereof connected with the lower-arm drive circuits, wherein the isolated power supply apparatus further comprises an integrated circuit that is provided on the board and includes the acquisition unit and the control unit, the upper-arm transformers are located adjacent to the integrated circuit in front view of a board surface of the board, the lower-arm transformer is located further away from the integrated circuit than the upper-arm transformers are in front view of the board surface of the board, and of the upper-arm transformers and the lower-arm transformer, at least two upper-arm transformers have the respective feedback windings.

8. An isolated power supply apparatus comprising:

a plurality of transformers;

a control switch;

an acquisition unit; and a control unit, wherein input sides of the transformers are connected with a DC power source and output sides of the transformers are connected with power supply targets corresponding to the transformers, at least two of the transformers have respective feedback windings, the control switch is configured to allow supply of electric power from the DC power source to the input sides of the transformers by being turned on and interrupt the supply of electric power from the DC power source to the input sides of the transformers by being turned off, the acquisition unit is configured to acquire, based on voltages generated in the feedback windings, a control value for feedback control, and the control unit is configured to turn on and off the control switch so as to feedback-control the control value to a target value and thereby control voltages on the output sides of the transformers, wherein the acquisition unit is configured to acquire, as the control value, a total control value that is either a sum of the voltages generated in the feedback windings or a correlation value of the sum, and the control unit is configured to turn on and off the control switch so as to feedback-control the total control value to the target value, wherein the isolated power supply apparatus is applied to a system comprising:

an electric power conversion circuit having upper-arm switches and lower-arm switches;

upper-arm drive circuits each of which is one of the power supply targets and configured to drive a corresponding one of the upper-arm switches;

lower-arm drive circuits each of which is one of the power supply targets and configured to drive a corresponding one of the lower-arm switches; and a board to which the upper-arm and lower-arm switches, the upper-arm and lower-arm drive circuits and the isolated power supply apparatus are mounted, wherein the transformers include:

upper-arm transformers each of which is provided on the board and has the input side thereof connected with the DC power source and the output side thereof connected with a corresponding one of the upper-arm drive circuits; and a lower-arm transformer that is provided on the board and has the input side thereof connected with the DC power source and the output side thereof connected with the lower-arm drive circuits, wherein the isolated power supply apparatus further comprises an integrated circuit that is provided on the board and includes the acquisition unit and the control unit, the upper-arm transformers are located adjacent to the integrated circuit in front view of a board surface of the board, the lower-arm transformer is located further away from the integrated circuit than the upper-arm transformers are in front view of the board surface of the board, and of the upper-arm transformers and the lower-arm transformer, at least two upper-arm transformers have the respective feedback windings.

9. An isolated power supply apparatus comprising:

a plurality of transformers;

a control switch;

an acquisition unit; and a control unit, wherein input sides of the transformers are connected with a DC power source and output sides of the transformers are connected with power supply targets corresponding to the transformers, at least two of the transformers have different numbers of the power supply targets connected therewith, a specific transformer, which has a maximum number of the power supply targets connected with the output side thereof among the transformers, has a feedback winding, the control switch is configured to allow supply of electric power from the DC power source to the input sides of the transformers by being turned on and interrupt the supply of electric power from the DC power source to the input sides of the transformers by being turned off, the acquisition unit is configured to acquire, based on a voltage generated in the feedback winding, a control value for feedback control, and the control unit is configured to turn on and off the control switch so as to feedback-control the control value to a target value and thereby control voltages on the output sides of the transformers.

10. The isolated power supply apparatus as set forth in claim 9, wherein the isolated power supply apparatus is applied to a system comprising:

an electric power conversion circuit having a plurality of series connection units each consisting of an upper-arm switch and a lower-arm switch;

a plurality of upper-arm drive circuits each of which is one of the power supply targets and configured to drive a corresponding one of the upper-arm switches of the series connection units; and a plurality of lower-arm drive circuits each of which is one of the power supply targets and configured to drive a corresponding one of the lower-arm switches of the series connection units, the transformers include:

upper-arm transformers the input sides of which are connected with the DC power source and the output sides of which are connected with the upper-arm drive circuits; and a lower-arm transformer the input side of which is connected with the DC power source and the output side of which is connected with the lower-arm drive circuits, wherein the upper-arm transformers are provided individually respectively corresponding to the upper-arm drive circuits, the lower-arm transformer is provided as a common transformer to all the lower-arm drive circuits, and the specific transformer is, among the upper-arm transformers and the lower-arm transformer, the lower-arm transformer.

* * * * *